United States Patent [19]

Trujillo

[11] Patent Number: 4,792,654

[45] Date of Patent: Dec. 20, 1988

[54] METHOD AND APPARATUS FOR MANUFACTURING SLOW-WAVE STRUCTURES FOR TRAVELING-WAVE TUBES

[75] Inventor: Manuel A. Trujillo, Buena Park, Calif.

[73] Assignee: Hughes Aircraft Company, Los Angeles, Calif.

[21] Appl. No.: 116,927

[22] Filed: Nov. 4, 1987

[51] Int. Cl.⁴ .......................... B23H 1/00; B23H 9/00

[52] U.S. Cl. .................................... 219/69 V; 29/600; 219/69 R; 219/69 E; 219/69 M

[58] Field of Search ................ 219/69 V, 69 G, 69 E, 219/68, 69 R, 69 M, 69 D; 72/80, 81, 83, 90; 204/129.1, 129.2, 129.25, 129.5, 224 M; 29/600, 601, 2.21

[56] References Cited

U.S. PATENT DOCUMENTS

| | | | |
|---|---|---|---|
| 3,562,702 | 2/1971 | Celovsky | 219/69 M |
| 3,600,546 | 8/1971 | Niwa et al. | 219/69 M |
| 3,640,181 | 2/1972 | Whitfill, Jr. | 29/2.21 |
| 3,840,718 | 10/1974 | Myers | 219/69 R |
| 4,268,778 | 5/1981 | Friz | 29/600 |
| 4,465,987 | 8/1984 | Manoly | 29/600 |
| 4,729,510 | 3/1988 | Landis | 29/600 |

FOREIGN PATENT DOCUMENTS

| | | | |
|---|---|---|---|
| 186530 | 10/1983 | Japan | 219/69 E |
| 155320 | 8/1985 | Japan | 219/69 G |
| 658634 | 4/1979 | U.S.S.R. | 29/600 |

*Primary Examiner*—A. D. Pellinen
*Assistant Examiner*—Geoffrey S. Evans
*Attorney, Agent, or Firm*—Paul M. Coble; A. W. Karambelas

[57] ABSTRACT

A tubular blank from which a slow-wave structure is to be formed is mounted on a mandrel in front of and spaced slightly from an electrode having a predetermined pattern of slots corresponding to areas along the tubular blank from which material is not to be removed. The blank and the electrode are connected to an electrical discharge machine to establish electrical discharges between the blank and the electrode, and the mandrel and the blank carried thereby are simultaneously advanced and rotated past the electrode. Portions of the blank adjacent to the non-slotted surface portions of the electrode are removed, while the portions of the blank adjacent to the slots in the electrode are retained.

27 Claims, 4 Drawing Sheets

METHOD AND APPARATUS FOR MANUFACTURING SLOW-WAVE STRUCTURES FOR TRAVELING-WAVE TUBES

FIELD OF THE INVENTION

This invention is directed to a method and apparatus for manufacturing slow-wave structures particularly useful in traveling-wave tubes and similar structures.

BACKGROUND OF THE INVENTION

Traveling-wave tubes employ an axial high voltage electron beam with a slow-wave structure disposed therearound. The slow-wave structures are of several configurations, for example, helical, bifilar helical, and rings. Sometimes the helixes, particularly the multifilar helixes, are ring-strapped to short out opposite sides of opposite helixes. The diameter of the slow-wave structure is a function of the coupling efficiency, frequencv and power. Consequently, the critical shape of the slow-wave structure must be maintained to achieve the desirable characteristics of the traveling-wave tube.

In previous manufacturing practices, slow-wave structures have been manufactured using a complex process of mandrel winding, brazing, grinding, and deburring. However, problems have arisen with controlling the angle of the helix and in the deburring of such structures. The mandrel winding, brazing, grinding, and deburring of such parts is difficult, especially because the parts of smaller size are very delicate. In addition, manufacturing problems are increased by the fact that the materials are refractory. Molybdenum and tungsten are preferred metals for such slow-wave structures and are by nature brittle and difficult to form. Accordingly, there is need for a manufacturing process which economically and accurately provides parts which by prior methods were difficult to manufacture.

SUMMARY OF THE INVENTION

In order to aid in the understanding of this invention, it can be stated in essentially summary form that it is directed to a method and apparatus for manufacture of slow-wave structures and similar structures wherein a tubular blank is mounted upon a rotatable mandrel. The mandrel is positioned spaced from an electrode, and as the mandrel is moved past the electode, it is rotated, while employing electrical discharge sparks which machine the tubular blank to the configuration dictated by the electrode pattern.

It is, thus, a purpose and advantage of this invention to provide a method and apparatus for manufacturing slow-wave structures and similar parts wherein such parts can be economically and accurately manufactured, even in very small sizes and with thin walls.

Another purpose and advantage of this invention is to provide an apparatus for electrical discharge machining of tubular parts to achieve cuts in the parts in critical relationships.

It is another purpose and advantage of this invention to provide a method of manufacture which results in cheaper, simpler and uniform parts in a one-step manufacturing process so that the end product, traveling-wave tubes employing slow-wave structures, manufactured by this method are uniform and reliable.

Other purposes and advantages of this invention will become apparent from a study of the following portion of the specification, the claims and the attached drawings.

DESCRIPTION OF PREFERRED EMBODIMENTS

Figure 1:
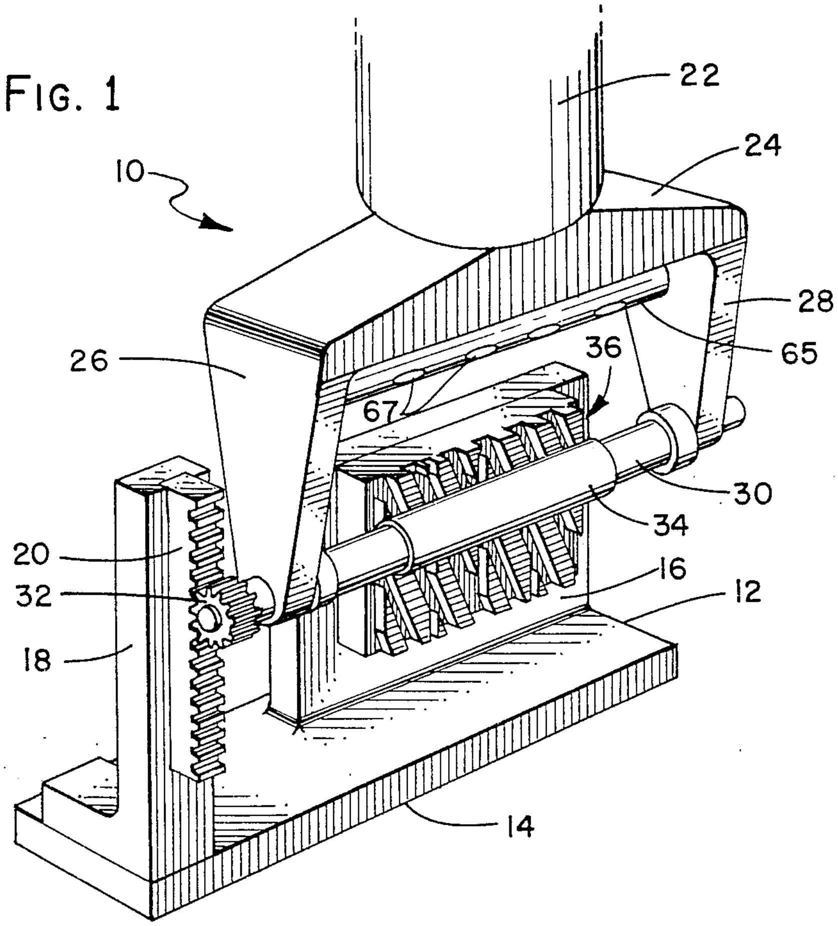
FIG. 1 is perspective view of a portion of the apparatus used according to this invention for the manufacture of slow-wave structures and similar parts.

FIG. 1 shows apparatus 10 for manufacturing slow-wave structures in accordance with this invention. The apparatus 10 is a fixture for an electrical discharge machine. It comprises a base fixture 12 which has a flat bottom surface 14 for securing on the table of the electrical discharge machine. Upstanding from the base 12 is a mounting surface 16 which is at right angles to the bottom surface 14. Rack holder 18 is also mounted on base 12 and carries a rack 20. Rack 20 has a plurality of gear teeth thereon lying in a plane which is at right angles to the bottom surface 14 and parallel to mounting surface 16.

A ram 22 is movably mounted with respect to the table of the electrical discharge machine. Ram 22 moves along a straight line and is non-rotating. It may be a hydraulic ram or may be a ram which is screw-driven by an electric motor. Both such rams would have keys to prevent rotation. The line of advance and retraction of the ram 22, that is the line towards and away from the table of the electrical discharge machine and towards and away from the base 12, is perpendicular to the flat bottom surface 14 and is parallel to the mounting surface 16. A yoke 24 is mounted on ram 22 and carries downwardly directed fingers 26 and 28. Adjacent the lower end of the fingers 26 and 28, mandrel 30 extends between the fingers and is rotatably mounted therein. The pivot axis of the mandrel 30 is oriented so that it is parallel to the mounting surface 16. Mandrel 30 carries pinion 32 at one end which engages the gear teeth of rack 20. The pitch diameter of pinion 32 is the same as the diameter of mandrel 30.

In order to machine a slow-wave structure, a tubular blank 34 from which the desired slow-wave structure will be machined is mounted on the mandrel 30 to rotate with the mandrel 30. Therefore, the blank 34 has an inside diameter to slidably fit upon mandrel 30 and has an outside diameter of the size of the desired finished exterior of the slow-wave structure. In order to give an example of size, in one utilization in a traveling-wave tube slow-wave structure, the blank 34 has an outside diameter of 0.110 inch and an inside diameter of 0.090 inch. The blank 34 may be made of molybdenum or tungsten.

Figure 2:
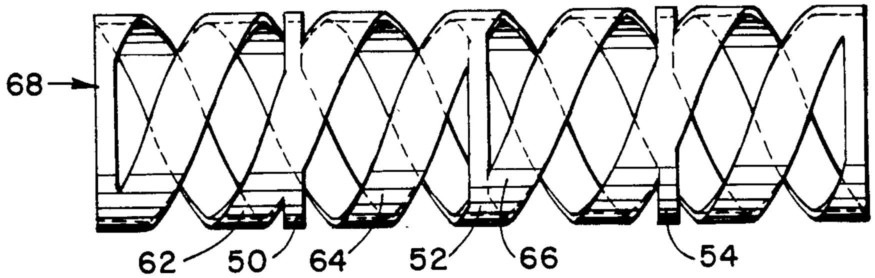
FIG. 2 is a side-elevational view of a ring-strapped bifilar helix as a slow-wave structure for a tube.
Figure 3:
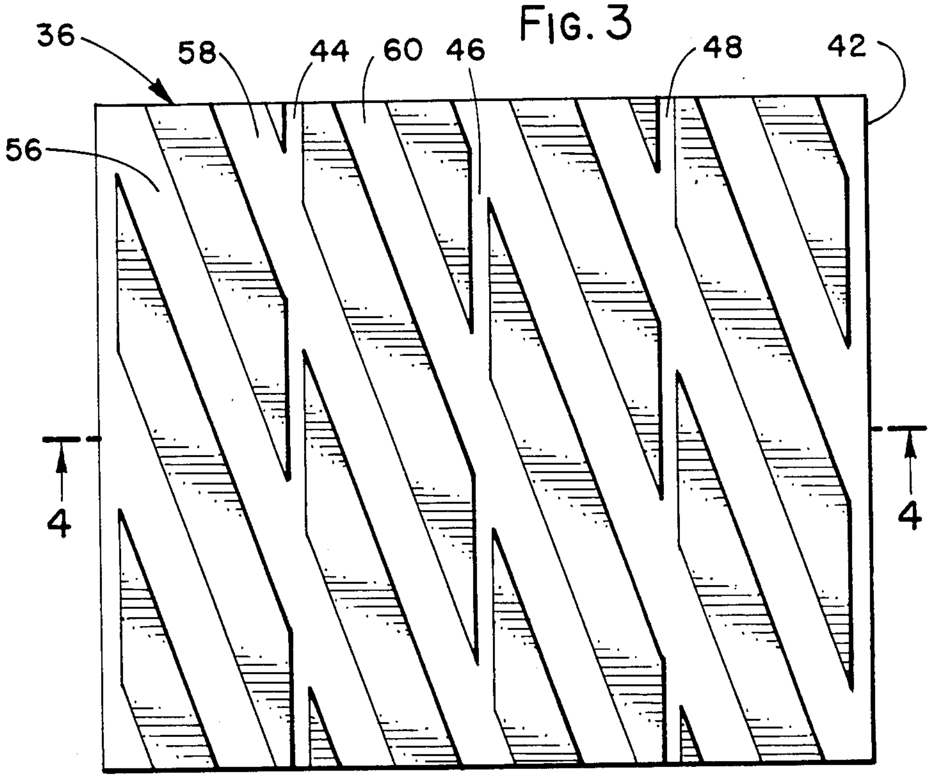
FIG. 3 is a plan view of an electrode for use in producing the helix of FIG. 2 in the apparatus shown in FIG. 1.
Figure 4:
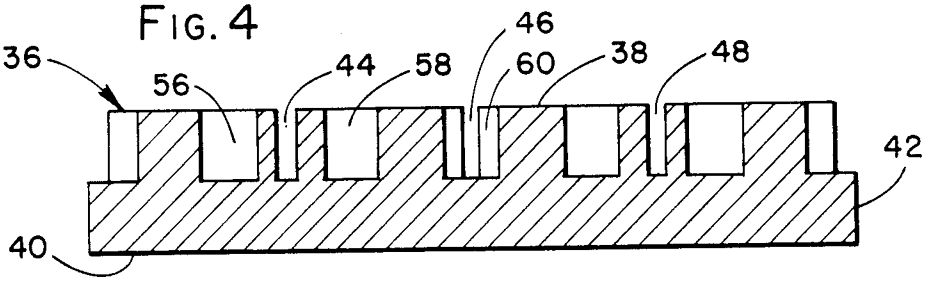
FIG. 4 is a sectional view taken generally along the line 4—4 of FIG. 3.

An electrode 36 is mounted on surface 16. A particular exemplary electrode 36 is shown in more detail in FIGS. 3 and 4 for machining a desired slow-wave structure such as the slow-wave structure 68 of FIG. 2 from the blank 34. As seen in FIGS. 3 and 4, electrode 36 is a rectangular block having a front face 38 which is parallel to its back face 40. With the back face 40 mounted on mounting surface 16 and the axis of rotation of mandrel 30 parallel to the mounting surface 16, and with the exterior of the blank 34 concentric with the axis of rotation of mandrel 30, it is seen that the front face 38 is parallel to a plane tangent to the nearest portion of the external surface of the blank 34. A small spacing exists between the front face 38 and the adjacent external surface of the blank 34.

Electrode 36 is made of a material suitable as an electrical discharge machine electrode, such as steel. For reference purposes, the electrode 36 has a straight edge 42 which is parallel to the direction of motion of ram 22 and the direction of motion of the yoke 24 carried thereon. The extent of the electrode 36 along the aforementioned direction of motion should be equal to the circumferential distance around the outer surface of the blank 34, or an integral multiple thereof.

In the electrode 36 there are longitudinal slots 44, 46 and 48. As the ram 22 moves slowly downward, the blank 34 rotates in front of the electrode 36, and since electrical discharge machining does not occur along these slots, the resultant machined structure 68 has respective rings 50, 52 and 54 which correspond to the slots 44, 46 and 48. Furthermore, the electrode 36 has a plurality of diagonal slots, three of which are indicated at 56, 58 and 60, which similarly give rise to spiral helixes 62, 64 and 66, respectively, in the resultant structure 68. The further longitudinal and diagonal slots shown in FIG. 3 result in the bifilar helices 62 and 64. Helix 66 is a continuation of helix 62, as shown in FIG. 2. The pitch or angle of the diagonal slots is such as to make the finished slow-wave structure 68 in the form of a bifilar helix with ring straps, as shown in FIG. 2. The angle of the diagonal slots on the electrode 36 is such that, in one circumference of the tubular blank 34, the angle of the slots advances in the axial direction of the mandrel two pitches. The electrode 36 thus provides a perfect spiral match when the blank 34 is turned a full revolution in front of the electrode 36.

In accordance with electrical discharge machining practice, the spacing, or gap, between the blank 34 and the electrode 36 is uniform. Typical spacings may vary from about 0.5 mil to about 1 mil, while exemplary discharge machining currents may vary from around 0.2 amp to around 10 amps, both depending upon the dimensions of the blank 34 and the type and amount of material to be removed. The time required for a typical machining operation in which the tubular blank 34 makes one revolution while traversing the extent of the electrode 36 may be in the range of 15 to 45 minutes.

Yoke 24 is provided with a coolant tube 65 which has outlets 67 directly above the electrical discharge machining space. The coolant tube 65 discharges machining liquid into the space. The machining liquid may be a dielectric oil and serves the multiple purposes of cooling, removing machined-away particles, and aiding in controlling the electric sparks. Coolant outlet holes may be provided in the bottom of the yoke 24 between the fingers 26 and 28, or a separate discharge manifold tube 65 may be placed under the yoke 22, as shown. The use of an adequate amount of clean coolant is important to good cutting. When the cut is complete, the slow-wave structure is finished and is free of burrs so that no additional process work is necessary to complete the slow-wave structure. It is removed from the mandrel and is ready for installation.

Figure 5:
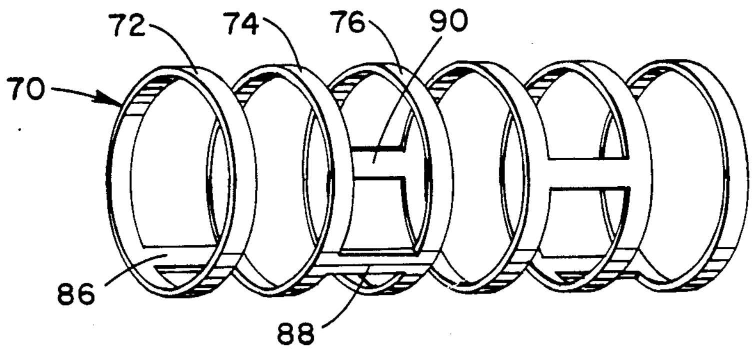
FIG. 5 is a perspective view of a ring-type slow-wave structure for use in a traveling-wave tube.
Figure 6:
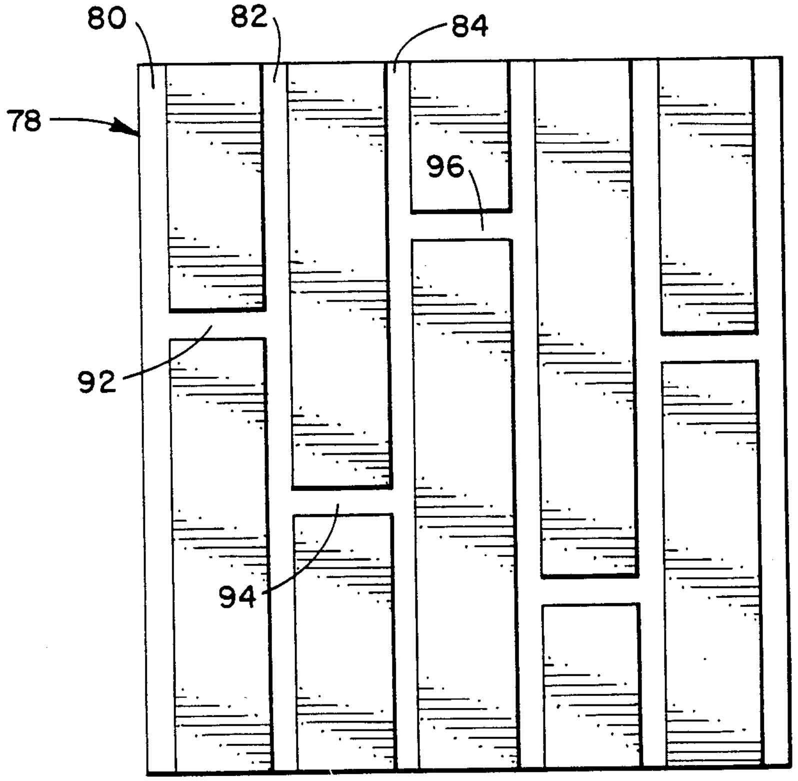
FIG. 6 is a plan view of an electrode for use in the apparatus of FIG. 1 to produce the slow-wave structure of FIG. 5.

As a further example of a slow-wave structure that can be fabricated using the present invention, slow-wave structure 70, shown in FIG. 5, has a plurality of axially spaced circular rings, the first three of which are indicated at 72, 74 and 76. Additional rings are present, as is shown in FIG. 5. An exemplary electrode 78 which may be used in fabricating the slow-wave structure 70 is similar to electrode 36 in that it has parallel front and back surfaces, and is mounted on electrode mounting surface 16. Electrode 78 has a plurality of parallel slots 80, 82 and 84 corresponding to rings 72, 74 and 76 and additional slots corresponding to the additional rings of the slow-wave structure 70. The slots 80, 82 and 84 are parallel to the direction of ram motion, and thus, when a tubular slow-wave structure blank is processed on the mandrel 30, the material away from the slots is machined away to leave the rings.

In the slow-wave structure 70 adjacent rings such as 72, 74 and 76 are connected together by means of straps such as 86, 88 and 90. These straps are produced in manufacturing by means of cross slots 92, 94 and 96 interconnecting respective pairs of adjacent longitudinal slots 80, 82 and 84 in the electrode 78. Since the cross slots 92, 94 and 96 are parallel to the mandrel 30, they result in the formation of straps parallel to the axis of the slow-wave structure. The straps can be positioned anywhere around the rings to achieve the desired mechanical and electrical purposes. It is only necessary to place the cross slots in the correct position in the electrode 78 to achieve the proper circumferential position of the straps around the circumference of the slow-wave structure. In this way, a ring-bar type slow-wave structure 70 is achieved.

Figure 7:
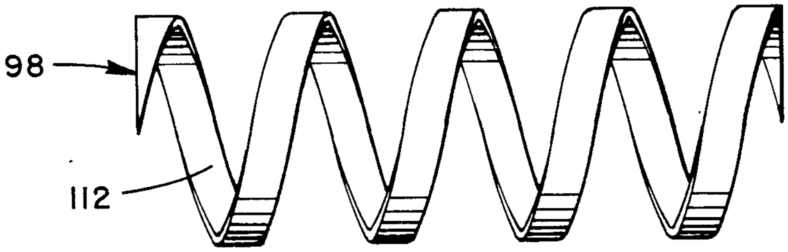
FIG. 7 is a side-elevational view of a helical slow-wave structure for use in a traveling-wave tube.
Figure 8:
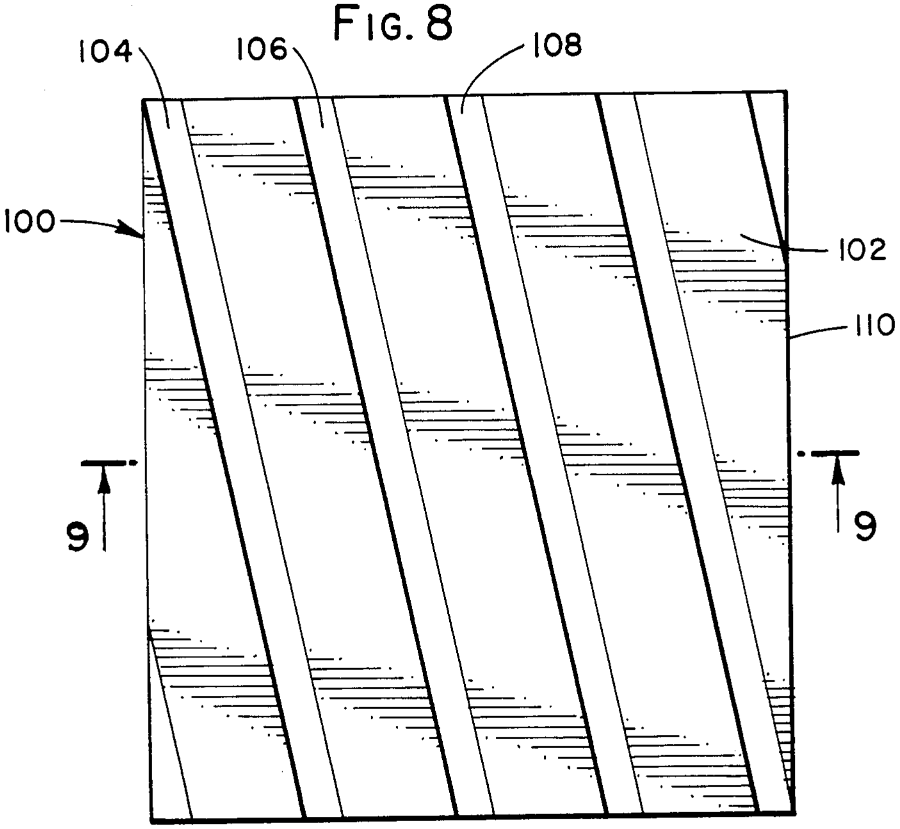
FIG. 8 is a plan view of an electrode for use in producing the helix of FIG. 7.
Figure 9:
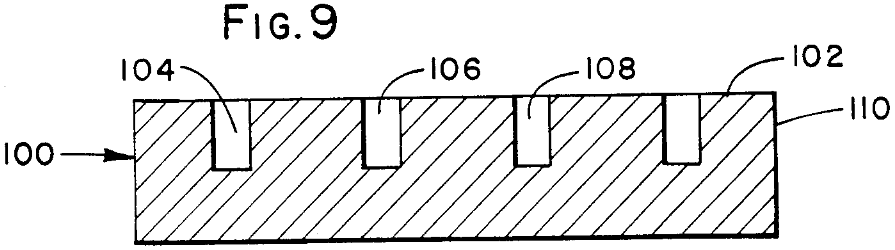
FIG. 9 is a sectional view taken generally along line 9—9 of FIG. 8.

As a further example of a slow-wave structure that can be fabricated using the present invention, FIG. 7 shows a slow-wave structure 98 of single helix configuration. The slow-wave structure 98 is produced by the above-described process by the employment of electrode 100. Electrode 100 has parallel front and back surfaces and has a plurality of diagonal slots 104, 106 and 108 cut into its front surface 102. The slots 104 are parallel to each other and have an angle such that, in one circumference of the blank 34 along the direction of motion of the ram axis parallel to the front face 102 and the edge 110, the slots advance one spiral pitch. Thus, when one revolution is made of the blank 34 in front of the electrode 100, the ends of the successive turns of the resultant spiral 112 left in the blank 34 join together. In this way, a continuous helical spiral 112 is achieved by rotating the blank 34 in front of the electrode 100 while removing material from the blank 34 by electrical discharge machining.

It has been demonstrated that different configurations of traveling-wave tube slow-wave structures can be manufactured by this process, and it is clear that other tubular cylindrical forms can also be machined around their entire circumference by means of the aforementioned process. Thus, tubes can be machined for other purposes.

This invention has been described in its presently contemplated best mode, and it is clear that it is susceptible to numerous modifications, modes and embodiments within the ability of those skilled in the art and without the exercise of the invention faculty. Accordingly, the scope of this invention is defined by the scope of the following claims.

What is claimed is:

1. Apparatus for machining tubular objects comprising:
 a base for attachment to an electrical discharge machine, said base having a mounting surface carrying an electrode thereon with the electrode having a face, said face having recessed portions therein and terminating in a planar electrode front surface;
 a ram movably mounted with respect to said base along an axis parallel to said electrode face;
 a mandrel rotatably mounted on said ram so that the axis of rotation of said mandrel is parallel to said electrode face; and
 means interconnecting said base and said mandrel so that as said ram moves along said axis said mandrel rotates in a plane parallel to said electrode face.

2. Apparatus according to claim 1 wherein said means interconnecting said base and said mandrel is a rack mounted on said base and a pinion secured to said mandrel with said pinion interengaged with said rack.

3. Apparatus according to claim 1 wherein said base has an upstanding electrode holder thereon, said electrode holder having a mounting surface thereon carrying said electrode.

4. Apparatus according to claim 3 wherein said ram carries a yoke having first and second fingers between which a bearing is carried, said mandrel being rotatably mounted on said bearing.

5. Apparatus according to claim 3 and further including means for discharging coolant into the space between said mandrel and said electrode holder.

6. Apparatus according to claim 1 wherein a tube is mounted on said mandrel for rotation about its axis so that as said ram advances said mandrel and said tube rotate such that the separation between the outer surface of said tube and said electrode face remains constant.

7. Apparatus for forming tubular structures comprising:
 means carrying an electrode having a planar face and recesses extending inwardly from said planar face;
 means rotatably and translationally carrying a tube so that the external surface of said tube is located a substantially constant distance from said electrode face;
 means for causing translational advance of said tube;
 means for rotating said tube as it is translationally advanced so that said tube moves past the surface of said electrode face while spaced therefrom at a distance such that when said electrode and said tube are electrically activated in an electrical discharge machine, said tube is machined in accordance with the pattern of said recesses in said electrode.

8. Apparatus according to claim 7 wherein the extent of said electrode face along the direction of said translational advance is equal to the circumferential distance around the outer surface of said tube or an integral multiple thereof.

9. Apparatus according to claim 7 wherein said electrode has a plurality of elongated slots extending inwardly from said planar face and disposed parallel to one another.

10. Apparatus according to claim 9 wherein said elongated slots are disposed at an angle other than 0° and 90° with respect to the direction of translational advance of said tube.

11. Apparatus according to claim 9 wherein said electrode has a plurality of further slots extending inwardly from said planar face and extending between at least certain ones of adjacent pairs of said elongated slots, said further slots being disposed parallel to on another.

12. Apparatus according to claim 11 wherein said further slots are disosed at an angle other than 0° and 90° with respect to said elongated slots and are disposed substantially parallel to the direction of said translational advance.

13. Apparatus according to claim 11 wherein said elongated slots are disposed substantially parallel to the direction of said translational advance, and said further slots are disposed substantially perpendicular to said elongated slots.

14. Apparatus according to claim 7 wherein said means rotatably and translationally carrying said tube comprises a rotatable mandrel carrying said tube, a pinion rotatably fixed to said mandrel, and a rack positioned parallel to the direction of translational movement of said tube so that translational advance of said mandrel also causes rotation thereof.

15. Apparatus according to claim 14 and further including a ram having said mandrel rotatably mounted thereon, said ram being translationally mounted with respect to said electrode mounting means.

16. Apparatus according to claim 7 and further including an electrode mounted on said electrode mounting means and a tube mounted for rotation and translation in front of said electrode, said electrode and said tube being electrically connected to an electrical discharge machine.

17. Apparatus according to claim 16 and further including means for distributing liquid coolant into the space between said tube and said electrode.

18. A method for forming a machined tubular structure comprising the steps of:
 positioning a tubular blank from which the resultant structure is to be formed in front of and spaced from a planar surface of an electrode having recesses extending inwardly from said planar surface corresponding to areas along said tubular blank from which material is not to be removed; and
 electrically machining said tubular blank by said electrode while simultaneously advancing and rotating said tubular blank past said electrode, whereby portions of said tubular blank adjacent to the non-recessed portions of said planar surface are removed and portions of said tubular blank adjacent to the recesses in said electrode are retained.

19. A method according to claim 18 and further including the step of discharging liquid coolant between said tubular blank and said electrode to control the electrical machining and carry away removed particles from said blank.

20. A method for forming a slow-wave structure comprising the steps of:
 positioning a tubular blank from which the slow-wave structure is to be formed in front of and spaced from a planar surface of an electrode having slots extending inwardly from said planar surface corresponding to areas along said tubular blank from which material is not to be removed; and electrically machining said tubular blank by said electrode while simultaneously advancing and rotating said tubular blank past said electrode, whereby portions of said tubular blank adjacent to the non-slotted portions of said planar surface are removed and portions of said tubular blank adjacent to the slots in said electrode are retained.

21. A method according to claim 20 wherein the extent of said electrode along the direction of advance of said tubular blank is equal to the circumferential distance around the outer surface of said tubular blank or an integral multiple thereof.

22. A method according to claim 20 wherein said electrode has a plurality of elongated slots extending inwardly from said planar surface and disposed parallel to one another.

23. A method according to claim 22 wherein said elongated slots are disposed at an angle other than 0° and 90° with respect to the direction of advance of said tubular blank.

24. A method according to claim 22 wherein said electrode has a plurality of further slots extending inwardly from said planar surface and extending between at least certain ones of adjacent pairs of said elongated slots, said further slots being disposed parallel to one another.

25. A method according to claim 24 wherein said further slots are disposed at an angle other than 0° and 90° with respect to said elongated slots and are disposed substantially parallel to the direction of advance of said tubular blank.

26. A method according to claim 24 wherein said elongated slots are disposed substantially parallel to the direction of said advance of said tubular blank and said further slots are disposed substantially perpendicular to said elongated slots.

27. A method according to claim 20 and further including the step of discharging liquid coolant between said tubular blank and said electrode to control the electrical machining and carry away removed particles from said blank.

* * * * *